(12) United States Patent
Sicinski et al.

(10) Patent No.: US 9,458,013 B1
(45) Date of Patent: Oct. 4, 2016

(54) PROCESS FOR THE PRODUCTION OF HYDROGEN

(71) Applicant: AIR PRODUCTS AND CHEMICALS, INC., Allentown, PA (US)

(72) Inventors: Michael Andrew Sicinski, Orefield, PA (US); Christopher H. Wood, Schnecksville, PA (US); Bryan Clair Hoke, Jr., Bethlehem, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 0 days.

(21) Appl. No.: 14/722,331

(22) Filed: May 27, 2015

(51) Int. Cl.
 *C01B 3/38* (2006.01)
 *B01D 53/047* (2006.01)

(52) U.S. Cl.
 CPC ............. *C01B 3/38* (2013.01); *B01D 53/047* (2013.01); *B01D 2256/16* (2013.01); *B01D 2257/104* (2013.01); *B01D 2259/40001* (2013.01); *B01D 2259/40011* (2013.01); *B01D 2259/41* (2013.01); *C01B 2203/0233* (2013.01); *C01B 2203/042* (2013.01); *C01B 2203/047* (2013.01); *C01B 2203/048* (2013.01); *C01B 2203/0495* (2013.01)

(58) Field of Classification Search
 CPC ............... B01D 2256/16; B01D 2259/40075; B01D 2259/40045; B01D 2259/4145; B01D 2253/102; B01D 2253/108; B01D 2259/40041; B01D 2253/104; B01D 2259/40047; B01D 2259/4068; B01D 2259/40026; B01D 53/047
 See application file for complete search history.

(56) References Cited

U.S. PATENT DOCUMENTS

| | | | |
|---|---|---|---|
| 5,733,359 A | 3/1998 | Doong et al. | |
| 7,037,358 B2 | 5/2006 | Babicki et al. | |
| 8,372,170 B2 | 2/2013 | Woods et al. | |
| 8,449,649 B2 | 5/2013 | Greenough | |
| 8,496,733 B2* | 7/2013 | Baksh | B01D 53/047 95/96 |
| 8,790,618 B2* | 7/2014 | Adams | B01D 53/047 252/373 |
| 2003/0157390 A1 | 8/2003 | Keefer et al. | |
| 2005/0188614 A1 | 9/2005 | Mirkovic et al. | |
| 2006/0177372 A1 | 8/2006 | Doshi | |
| 2007/0212293 A1 | 9/2007 | Porter et al. | |
| 2007/0237994 A1 | 10/2007 | Nakai et al. | |

\* cited by examiner

*Primary Examiner* — Stanley Silverman
*Assistant Examiner* — Syed Iqbal
(74) *Attorney, Agent, or Firm* — Bryan C. Hoke, Jr.

(57) ABSTRACT

Process for the production of a $H_2$-containing product in a hydrogen production facility comprising a catalytic steam-hydrocarbon reformer and a pressure swing adsorption unit. The process comprises a catalytic steam-hydrocarbon reformer shutdown mode, a pressure swing adsorption unit shutdown mode, a pressure swing adsorption unit maintenance state, a pressure swing adsorption unit startup mode, and a catalytic steam-hydrocarbon reformer startup mode. The pressure swing adsorption unit startup mode comprises purging the adsorption beds with $N_2$, then purging the adsorption beds with $H_2$, and then adjusting the pressure of the $H_2$ in the adsorption beds to within defined target pressure ranges.

20 Claims, 1 Drawing Sheet

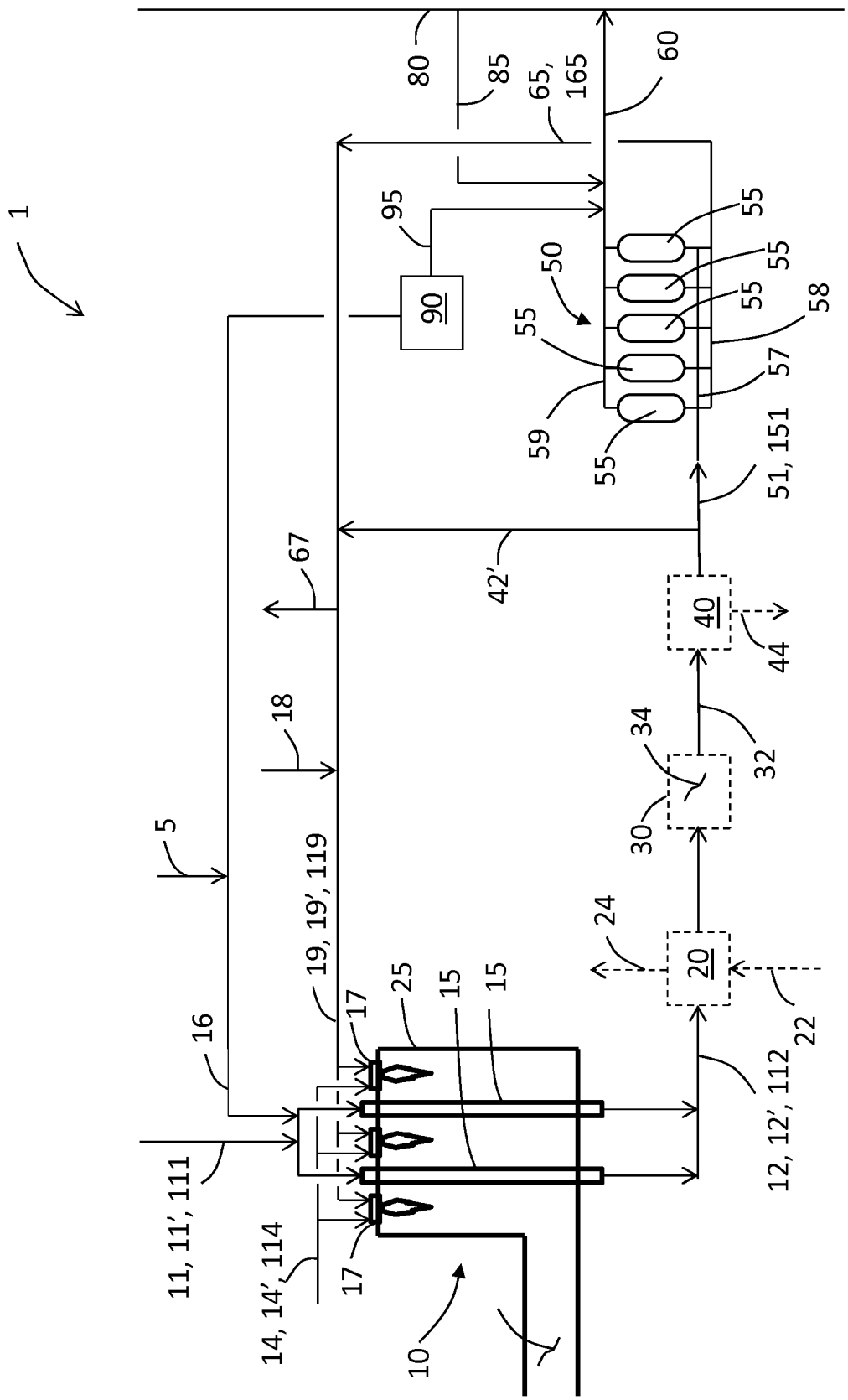

PROCESS FOR THE PRODUCTION OF HYDROGEN

BACKGROUND

The present invention relates to a process for the production of a $H_2$-containing product in a hydrogen production facility comprising a catalytic steam-hydrocarbon reformer and a pressure swing adsorption unit. More specifically the present process addresses the need to reduce the time to startup the hydrogen production facility after a maintenance event, and reduce the consumption of feedstock and fuel consumed during the startup mode after a maintenance event.

Related disclosures include U.S. Pat. No. 8,790,618 and U.S. Pat. Appl. Pub. No. 2007/0212293 (U.S. Pat. No. 7,670,587).

U.S. Pat. No. 8,790,618 discloses a method for starting up a hydrogen-generation assembly that includes a hydrogen-producing region (HPR) and a pressure swing adsorption (PSA) assembly. The hydrogen-producing region has a HPR hydrogen-producing, HPR shutdown, HPR dormant, and HPR startup states. The PSA assembly has a PSA hydrogen-purifying, PSA shutdown, PSA dormant, and PSA startup states. The U.S. Pat. No. 8,790,618 invention requires that the PSA startup sequence includes utilizing the PSA startup sequence at least partially concurrently with the HPR startup sequence where the PSA startup sequence begins after initiating and before completing the HPR startup sequence to transition the HPR from the HPR dormant state to the HPR hydrogen-producing state.

U.S. 2007/0212293 discloses a startup procedure for hydrocarbon fuel reformers. The system comprises a hydrogen generation system primarily consisting of a reformer unit 2, a hydrogen purification unit 3, which can be a pressure swing adsorption unit, and a hydrogen storage unit 4. FIG. 2 illustrates the startup procedure where gases flow through the reformer 2 and pass to the $H_2$ purification unit 3 (step 103) and the $H_2$ purification unit 3 is operated such that all gas flows to the combustor 15 (step 104). Various steps are taken during startup of the reformer unit 2 and the pressure swing adsorption unit 3 until the product purity and pressure from the $H_2$ purification unit 3 is established in step 115. Then the reformer unit and the hydrogen purification unit are started up concurrently in U.S. 2007/0212293.

Industry desires to startup the catalytic steam-hydrocarbon reformer and pressure swing adsorption unit quickly and safely.

Industry desires to startup the catalytic steam-hydrocarbon reformer and pressure swing adsorption unit while reducing the amount of unproductive feedstock and fuel consumed during the startup phase.

BRIEF SUMMARY

There are several aspects of the invention as outlined below. In the following, specific aspects of the invention are outlined below. The reference numbers and expressions set in parentheses are referring to an example embodiment explained further below with reference to the FIGURE. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

The present invention relates to a process for the production of a $H_2$-containing product (60) in a hydrogen production facility (1) comprising a catalytic steam-hydrocarbon reformer (10) and a pressure swing adsorption unit (50), the catalytic steam-hydrocarbon reformer (10) comprising a plurality of catalyst-containing reformer tubes (15) in a reformer furnace (25) and the pressure swing adsorption unit (50) comprising a plurality of adsorption beds (55).

Aspect 1. A process comprising:
a catalytic steam-hydrocarbon reformer production state wherein a reformer feed gas mixture (11) is introduced into the plurality of catalyst-containing reformer tubes (15), the reformer feed gas mixture (11) is reacted in a reforming reaction under reaction conditions effective to form a reformate (12) comprising $H_2$, CO, $CH_4$, and $H_2O$, and the reformate (12) is withdrawn from the plurality of catalyst-containing reformer tubes (15), and a fuel (19) is combusted with an oxidant gas (14) in the reformer furnace (25) external to the plurality of catalyst-containing tubes (15) wherein the fuel (19) comprises at least a portion of a by-product gas (65) from the pressure swing adsorption unit (50);

a pressure swing adsorption unit production state wherein the pressure swing adsorption unit (50) separates a pressure swing adsorption unit feed gas (51) formed from at least a portion of the reformate (12) withdrawn from the plurality of catalyst-containing reformer tubes (15) of the catalytic steam-hydrocarbon reformer (10) undergoing the catalytic steam-hydrocarbon reformer production state to produce the $H_2$-containing product (60) and the by-product gas (65), wherein each of the plurality of adsorption beds (55) are subjected to a repetitive cycle of steps, the repetitive cycle of steps comprising a production step, a depressurizing equalization step, a blowdown step, a pressurizing equalization step, and a pressurization step;

a catalytic steam-hydrocarbon reformer shutdown mode comprising discontinuing introduction of the reformer feed gas mixture (11) into the plurality of catalyst-containing tubes (15) and discontinuing combustion of the fuel (19) with the oxidant gas (14), wherein the catalytic steam-hydrocarbon reformer shutdown mode is subsequent to the catalytic steam-hydrocarbon reformer production state;

a pressure swing adsorption unit shutdown mode comprising discontinuing introduction of the pressure swing adsorption unit feed gas (51) into the plurality of adsorption beds (55) due to the catalytic steam-hydrocarbon reformer (10) entering the catalytic steam-hydrocarbon reformer shutdown mode, and subsequently purging the plurality of adsorption beds (55) with $N_2$ (95) to provide a $N_2$ concentration in each of the plurality of adsorption beds (55) greater than 96 volume % $N_2$, or greater than 99.6 volume % $N_2$, or greater than 99.96 volume % $N_2$, wherein the pressure swing adsorption unit shutdown mode occurs after the pressure swing adsorption unit production state;

a pressure swing adsorption unit maintenance state wherein the repetitive cycle of steps is halted and where air is introduced into the plurality of adsorption beds (55) and at least a portion of the $N_2$ in the plurality of adsorption beds (55) that was introduced during the pressure swing adsorption shutdown mode escapes the plurality of adsorption beds (55);

a pressure swing adsorption unit startup mode comprising purging the plurality of adsorption beds (55) with $N_2$ (95) to decrease the concentration of $O_2$ in each of the plurality of adsorption beds (55) to less than 1.3 volume % $O_2$, or less than 0.5 volume % $O_2$, subsequently purging the plurality of adsorption beds with $H_2$ (85) to provide a $H_2$ concentration in each of the plurality of adsorption beds (55) greater than 85 volume % $H_2$ or greater than 95 volume % $H_2$ or greater than 99 volume % $H_2$, and adjusting a pressure of the $H_2$ inside each of the plurality of adsorption beds (55) to within a respective defined target pressure range for each of the plurality of adsorption beds (55), the respective defined target pressure range defined by the step each adsorption bed will undergo first upon restarting the repetitive cycle of steps, wherein the pressure swing adsorption unit startup mode is subsequent to the pressure swing adsorption unit maintenance state; and a catalytic steam-hydrocarbon reformer startup mode comprising introducing a startup-mode reformer feed gas mixture (11') into the plurality of catalyst-containing reformer tubes (15), reacting the startup-mode reformer feed gas mixture under reaction conditions effective to form a startup-quality reformate (12') comprising $H_2$, CO, $CH_4$, and $H_2O$, and withdrawing the startup-quality reformate (12') from the plurality of catalyst-containing reformer tubes (15), and combusting a startup-mode fuel (19') with a startup-mode oxidant gas (14') in the reformer furnace (25) external to the plurality of catalyst-containing tubes (15);

wherein at least a portion of the pressure swing adsorption startup mode is concurrent with at least a portion of the catalytic steam-hydrocarbon reformer startup mode.

Aspect 2. The process of aspect 1 wherein during the pressure swing adsorption unit startup mode, the plurality of adsorption beds (55) are purged with $H_2$ independent of any of the plurality of adsorption beds (85) undergoing any step of the repetitive cycle of steps.

Aspect 3. The process of aspect 1 or aspect 2 wherein during the pressure swing adsorption unit startup mode, the pressure of the $H_2$ inside each of the plurality of adsorption beds (55) is adjusted to within the respective defined target pressure range for each of the plurality of adsorption beds (55) independent of any of the plurality of adsorption beds (85) under going any step of the repetitive cycle of steps.

Aspect 4. The process of any one of the preceding aspects wherein during the pressure swing adsorption unit startup mode, the repetitive cycle of steps is still halted.

Aspect 5. The process of any one of the preceding aspects wherein during the pressure swing adsorption unit startup mode, the plurality of adsorption beds (55) are purged with $H_2$ (85) prior to undergoing any step of the repetitive cycle of steps.

Aspect 6. The process of any one of the preceding aspects during the pressure swing adsorption unit startup mode, the pressure of the $H_2$ inside each of the plurality of adsorption beds (55) is adjusted prior to undergoing any step of the repetitive cycle of steps.

Aspect 7. The process of any one of the preceding aspects further comprising restarting the repetitive cycle of steps subsequent to completing the pressure swing adsorption unit startup mode (i.e. after the pressure of the $H_2$ inside each of the plurality of adsorption beds (55) has been adjusted to within the respective defined target pressure range for each of the plurality of adsorption beds (55)).

Aspect 8. The process of any one of the preceding aspects wherein during the pressure swing adsorption unit shutdown mode, the plurality of adsorption beds are purged with $N_2$ by sweep purging and/or pressurized purging.

Aspect 9. The process of any one of the preceding aspects wherein during the pressure swing adsorption unit startup mode, the plurality of adsorption beds are purged with $N_2$ by sweep purging and/or pressurized purging.

Aspect 10. The process of any one of the preceding aspects wherein during the pressure swing adsorption unit startup mode, the plurality of adsorption beds are purged with $H_2$ by sweep purging and/or pressurized purging.

Aspect 11. The process of any one of the preceding aspects wherein during the pressure swing adsorption unit startup mode, the one or more pipe headers are purged with $N_2$ by sweep purging and/or pressurized purging.

Aspect 12. The process of any one of the preceding aspects wherein during the pressure swing adsorption unit startup mode, the one or more pipe headers are purged with $H_2$ by sweep purging and/or pressurized purging.

Aspect 13. The process of any one of the preceding aspects wherein the pressure swing adsorption unit startup mode is initiated prior to initiating the catalytic steam-hydrocarbon reformer startup mode.

Aspect 14. The process of any one of the preceding aspects wherein no portion of the startup-quality reformate (12') is introduced into any of the plurality of adsorption beds (55).

Aspect 15. The process of any one of the preceding aspects wherein the startup-mode fuel (19') comprises no by-product gas (65) from the pressure swing adsorption unit (55).

Aspect 16. The process of any one of the preceding aspects wherein the $H_2$ for purging the plurality of adsorption beds during the startup mode is provided from a $H_2$ pipeline.

Aspect 17. The process of any one of the preceding aspects wherein the startup-quality reformate (12') is at least one of vented (67), flared, or used to form at least a portion of the startup-mode fuel (19').

Aspect 18. The process of any one of the preceding aspects wherein the catalytic steam-hydrocarbon reformer startup mode comprises introducing a $N_2$- and steam-containing stream (16) during heat-up of the plurality of catalyst-containing reformer tubes (15) prior to introducing the startup-mode reformer feed gas mixture (11') into the plurality of catalyst-containing reformer tubes (15).

Aspect 19. The process of any one of the preceding aspects wherein after discontinuing introduction of the reformer feed gas mixture (11) into the plurality of catalyst-containing tubes (15) in the catalytic steam-hydrocarbon reformer shutdown mode, the catalytic steam-hydrocarbon reformer shutdown mode comprises purging the plurality of catalyst-containing reformer tubes (15) with $N_2$ and/or steam to decrease the total concentration of combustible gases to less than 1 volume %.

Aspect 20. The process of any one of the preceding aspects wherein at least one of the plurality of adsorption beds (55) commences the production step upon restarting, at least one of the plurality of adsorption beds (55) commences the depressurizing equalization step upon restarting, at least one of the plurality of adsorption beds (55) commences the blowdown step upon restarting, at least one of the plurality of adsorption beds (55) commences the pressurizing equalization step upon restarting, and at least one of the plurality of adsorption beds (55) commences the pressurization step upon restarting.

Aspect 21. The process of any one of the preceding aspects further comprising:

a second catalytic steam-hydrocarbon reformer production state wherein a second state reformer feed gas mixture (111) is introduced into the plurality of catalyst-containing reformer tubes (15), the second state reformer feed gas mixture (111) is reacted under reaction conditions effective to form a second state reformate (112) comprising $H_2$, CO, $CH_4$, and $H_2O$, and the second state reformate (112) is withdrawn from the plurality of catalyst-containing reformer tubes (15), and a second state fuel (119) is combusted with a second state oxidant gas (114) in the reformer furnace (25) external to the plurality of catalyst-containing tubes (15) wherein the second state fuel (119) comprises a second state by-product gas (165) from the pressure swing adsorption unit (50); and a second pressure swing adsorption unit production state wherein the pressure swing adsorption unit (50) separates a second state pressure swing adsorption unit feed gas (151) formed from at least a portion of the second state reformate (112) withdrawn from the plurality of catalyst-containing reformer tubes (15) of the catalytic steam-hydrocarbon reformer (10) undergoing the second catalytic steam-hydrocarbon reformer production state to produce the $H_2$-containing product (60) and the second state by-product gas (165).

Aspect 22. The process of any one of the preceding aspects wherein the pressure swing adsorption unit startup mode further comprises purging one or more pipe headers (57, 58, 59) operatively connected to the plurality of adsorption beds (55) with $N_2$ (95) to decrease the concentration of $O_2$ in the one or more pipe headers (57, 58, 59) to less than 1.3 volume % $O_2$, or less than 0.5 volume % $O_2$, or less than 1000 ppmv $O_2$, subsequently purging the one or more pipe headers (57, 58, 59) with $H_2$ (85) to provide a $H_2$ concentration in each of the one or more pipe headers greater than 85 volume % $H_2$, or greater than 99 volume % $H_2$, and adjusting a pressure of the $H_2$ inside each of the one or more pipe headers to within a respective defined target pressure range for each of the one or more pipe headers (57, 58, 59).

Aspect 23. The process of any one of the preceding aspects further comprising a catalytic steam-hydrocarbon reformer maintenance state wherein air is introduced into the plurality of catalyst-containing reformer tubes and at least a portion of the $N_2$ in the plurality of catalyst-containing reformer tubes that was introduced during the catalytic steam-hydrocarbon reformer shutdown mode escapes the plurality of catalyst-containing reformer tubes.

Aspect 24. The process of any one of the preceding aspects wherein during the pressure swing adsorption unit startup mode, the pressure of the $H_2$ inside one of the plurality of adsorption beds (55) is adjusted independently from the pressure of the $H_2$ inside another one of the plurality of adsorption beds (55).

BRIEF DESCRIPTION OF SEVERAL VIEWS OF THE DRAWINGS

The sole FIGURE is a process flow diagram for the process for producing a $H_2$-containing gas.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

As used herein, pressure units are absolute pressure units unless expressly stated to be gauge pressure units.

Referring now to the drawing, the FIGURE shows a process flow diagram for a process for the production of a $H_2$-containing product 60.

The present invention relates to a process for the production of a $H_2$-containing product 60 in a hydrogen production facility 1. The hydrogen production facility comprises a catalytic steam-hydrocarbon reformer 10. The catalytic steam-hydrocarbon reformer comprises a plurality of catalyst-containing reformer tubes 15 in a reformer furnace 25. The reformer furnace comprises a radiant section and a convection section. The plurality of catalyst-containing reformer tubes is contained in the radiant section and various heat exchangers to recover heat from the combustion product gases are contained in the convection section of the reformer furnace.

Catalytic steam reforming, also called steam methane reforming (SMR) or steam reforming, is defined as any process used to convert reformer feedstock to synthesis gas by reaction with steam over a catalyst. Synthesis gas, commonly called syngas, is any mixture comprising hydrogen and carbon monoxide. The reforming reaction is an endothermic reaction and may be described generally as $C_nH_m + n\ H_2O \rightarrow n\ CO + (m/2+n)\ H_2$. Hydrogen is generated when synthesis gas is generated.

A production facility for generating hydrogen and/or synthesis gas is a reformer and associated equipment for the production of hydrogen and/or synthesis gas. Associated equipment may include, for example, adiabatic prereformers, convective prereformers, heat exchangers, pumps, fans, water-gas shift reactors, pressure swing adsorbers, condensers, boilers, steam drums, desulphurizers, deaerators, headers, manifolds, piping, etc.

Catalytic steam-hydrocarbon reforming takes place in a catalytic steam-hydrocarbon reformer 10. A catalytic steam-hydrocarbon reformer, also called a steam methane reformer, or catalytic steam reformer, is defined herein as any fired furnace used to convert feedstock containing elemental hydrogen and carbon to synthesis gas by a reaction with steam over a catalyst with heat provided by combustion of a fuel. Feedstock may be natural gas, methane, naphtha, propane, refinery fuel gas, refinery off-gas, or other suitable reformer feedstock known in the art. Suitable operating temperatures range from 350° C. to 650° C. at the inlet and 750° C. to 950° C. at the outlet of the reformer tubes. Suitable pressures range from 1 to 50 atm. Preferred operating conditions for a catalytic steam-hydrocarbon reformer are known in the art.

Feedstock is blended with steam to form reformer feed gas mixture 11. The feedstock for forming the reformer feed gas mixture 11 may be pretreated in one or both of a hydrogenation unit (not shown) and/or a hydrodesulphurization unit (not shown) to remove sulfur. Hydrogen is blended with the feedstock prior to passing the feedstock to the hydrogenation unit and/or the hydrodesulphurization unit.

The reformer feed gas mixture 11 may be "prereformed" in a prereformer (not shown). The feed to the prereformer comprises $H_2$, which may be added and/or left over from the hydrogenation unit and/or the hydrodesulphurization unit. The feed to the prereformer has a steam-to-carbon molar ratio and a hydrogen stoichiometric ratio, which may have ranges as described in EP2762442, incorporated herein by reference.

As used herein, a reformate stream is any stream comprising hydrogen and carbon monoxide formed from the reforming reaction of a hydrocarbon and steam.

Reformer furnaces with a plurality of catalyst-containing reformer tubes, i.e. tubular reformers, are well known in the art. Suitable materials and methods of construction are known. Catalyst in the catalyst-containing reformer tubes may be any suitable catalyst known in the art, for example, a supported catalyst comprising nickel.

The hydrogen production facility 1 also comprises a pressure swing adsorption unit 50. A pressure swing adsorption unit is defined as any device that separates different gas components by preferential adsorption of at least one component relative to another component. The pressure swing adsorption unit comprises a plurality of adsorption beds each containing one or more adsorbents. Pressure swing adsorption units, their design, adsorbents for use therein, their operation and manufacture are well-known. Any suitable pressure swing adsorption unit may be used in the present process.

The process comprises a catalytic steam-hydrocarbon reformer production state. During the catalytic steam-hydrocarbon reformer production state, a reformer feed gas mixture 11 is introduced into the plurality of catalyst-containing reformer tubes 15, the reformer feed gas mixture 11 is reacted in a reforming reaction under reaction conditions effective to form a reformate 12 comprising $H_2$, CO, $CH_4$, and $H_2O$, and the reformate 12 is withdrawn from the plurality of catalyst-containing reformer tubes 15. Also during the catalytic steam-hydrocarbon reformer production state, a fuel 19 is combusted with an oxidant gas 14 in the reformer furnace 25 external to the plurality of catalyst-containing tubes 15 to provide heat for the reforming reaction.

The reformer feed gas mixture 11 comprises steam and hydrocarbons, typically in the form of natural gas or prereformed natural gas. The relative amounts of steam and hydrocarbons in the reformer feed gas mixture are defined by a steam-to-carbon molar ratio. The steam-to-carbon molar ratio is a conventional term in the field of hydrogen production. The steam-to-carbon molar ratio (S/C ratio) is defined as the (overall) ratio of the moles of steam to moles of carbon atoms in the hydrocarbons in the feed(s) to the reformer. For example if the molar flow rate of steam is 6 moles/s, the molar flow rate of methane is 1 mole/s and the molar flow rate of ethane is 1 mole/s, the steam-to-carbon molar ratio is 2.0. 1 mole/s of methane provides 1 mole of carbon per second and 1 mole/s of ethane provides 2 moles of carbon per second. The steam-to-carbon molar ratio during the catalytic steam-hydrocarbon reformer production state may range from 1.5 to 5, or from 1.5 to 3.5.

The fuel 19 comprises at least a portion of a by-product gas 65 from the pressure swing adsorption unit 50. The by-product gas 65 from the pressure swing adsorption unit is often called "tail gas." The fuel 19 may also comprise a supplemental fuel 18, which is typically called "trim fuel." Supplemental fuel 18 may be natural gas or other suitable fuel. The by-product gas and the trim fuel may be mixed and introduced through burners together into the reformer furnace 25 or each may be introduced separately through separate ports in the burners. The by-product gas may provide 50 to 98% of the heat duty with the balance provided by trim fuel.

Oxidant gas 14 is typically air, which may be preheated by indirect heat transfer with combustion product gases in the convection section of the reformer furnace 25. The oxidant gas 14 may be oxygen-enriched air or industrial grade oxygen. The oxidant gas 14 may comprise gas turbine exhaust.

The process comprises a pressure swing adsorption unit production state. During the pressure swing adsorption unit production state, the pressure swing adsorption unit 50 separates a pressure swing adsorption unit feed gas 51 to produce the $H_2$-containing product 60 and the by-product gas 65. The pressure swing adsorption unit feed gas 51 is formed from at least a portion of the reformate 12 withdrawn from the plurality of catalyst-containing reformer tubes 15 of the catalytic steam-hydrocarbon reformer 10 undergoing the catalytic steam-hydrocarbon reformer production state.

As shown in the FIGURE, reformate 12 may be passed to waste heat boiler 20 where water 22 is passed in indirect heat transfer with the reformate to form steam 24. The steam generation system may include a steam drum, deaerator, etc. as is known in the art. The reformate may be passed to one or more shift reactors 30 containing shift catalyst 34 to react water with CO and form additional $H_2$ in the reformate. The reformate stream may be further cooled to condense water 44, which may be removed in a condenser/knock-out drum 40. The reformate may also be passed to a $CO_2$ removal unit (not shown) to form a $CO_2$ by-product before being passed to the pressure swing adsorption unit 50. The pressure swing adsorption unit 50 may also be designed to produce a $CO_2$ by-product.

Each of the plurality of adsorption beds 55 are subjected to a repetitive cycle of steps typically called a pressure swing adsorption cycle. The repetitive cycle of steps comprise a production step, a depressurizing equalization step, a blowdown step, a pressurizing equalization step, and a pressurization step. Pressure swing adsorption cycles are well-known in the art and the various steps are described for example in U.S. Pat. Appl. Pub. No. 2014/0373713, incorporated herein by reference. Any suitable pressure swing adsorption cycle may be used in the present process.

The process comprises a catalytic steam-hydrocarbon reformer shutdown mode. The catalytic steam-hydrocarbon reformer shutdown mode comprises discontinuing introduction of the reformer feed gas mixture 11 into the plurality of catalyst-containing tubes 15 and discontinuing combustion of the fuel 19 with the oxidant gas 14. The catalytic steam-hydrocarbon reformer shutdown mode is subsequent to the catalytic steam-hydrocarbon reformer production state. During the catalytic steam-hydrocarbon reformer shutdown mode, the reformer feed gas mixture 11 is not introduced into the plurality of catalyst-containing tubes 15 of the catalytic steam-hydrocarbon reformer 10 and the fuel 19 is not combusted in the reformer furnace 25.

After discontinuing introduction of the reformer feed gas mixture 11 into the plurality of catalyst-containing tubes 15 during the catalytic steam-hydrocarbon reformer shutdown mode, the catalytic steam-hydrocarbon reformer shutdown mode may further comprise purging the plurality of catalyst-containing reformer tubes 15 with $N_2$ and/or steam to decrease the total concentration of combustible gases (e.g. $CH_4$, CO, and $H_2$) to less than 1 volume %. Nitrogen and/or steam may be provided in an amount sufficient to decrease the concentration of combustible gases in each of the plurality of reformer tubes below the lower explosive limit (LEL) of the combustible gas mixture contained therein.

The process comprises a pressure swing adsorption unit shutdown mode, which occurs subsequent to the pressure swing adsorption unit production state. The pressure swing adsorption unit shutdown mode comprises discontinuing introduction of the pressure swing adsorption unit feed gas 51 into the plurality of adsorption beds 55 due to the catalytic steam-hydrocarbon reformer 10 entering the catalytic steam-hydrocarbon reformer shutdown mode. During the pressure swing adsorption unit shutdown mode, no pressure swing adsorption unit feed gas comprising reformate from the catalytic steam-hydrocarbon reformer is introduced into any of the plurality of adsorption beds 55.

Subsequent to discontinuing introduction of the pressure swing adsorption unit feed gas 51 into the plurality of adsorption beds 55, the shutdown mode comprises purging the plurality of adsorption beds 55 with $N_2$ 95 to provide a $N_2$ concentration in each of the plurality of adsorption beds 55 greater than 96 volume % $N_2$, or greater than 99.6 volume % $N_2$, or greater than 99.96 volume % $N_2$. The $N_2$ 95 may be provided from $N_2$ source 90, which may be a compressed gas $N_2$ source or a liquid $N_2$ source with vaporizers. The plurality of adsorption beds 55 may be purged with a quantity of $N_2$ in an amount sufficient to provide a $N_2$ concentration in each of the plurality of adsorption beds greater than 96 volume % $N_2$, or greater than 99.6 volume % $N_2$, or greater than 99.96 volume % $N_2$, and/or decrease the concentration of combustible gases in the plurality of adsorption beds below the lower explosive limit or below 10% of the lower explosive limit, or below 1% of the lower explosive limit. Purging with $N_2$ may be by sweep purging or pressurized purging. In sweep purging, $N_2$ is introduced into the adsorption vessels while an effluent gas containing unwanted combustible gases is simultaneously removed. The pressure of the $N_2$ during sweep purging may range from greater than atmospheric pressure to 377 kPa (40 psig) or may range from 170 kPa (10 psig) to 273 kPa (25 psig). In pressurized purging, $N_2$ is introduced to increase the pressure in the adsorption vessels to any suitable pressure and an effluent gas is subsequently withdrawn from the adsorption vessels thereby removing unwanted combustible gases from the adsorption beds and decreasing the pressure in the adsorption vessels.

Combustible gases are purged from the adsorption beds in order to avoid an explosive mixture or toxic hazard from CO in the adsorption beds in the subsequent maintenance state.

The process comprises a pressure swing adsorption unit maintenance state. During the pressure swing adsorption unit maintenance state air is introduced into the plurality of adsorption beds 55 and at least a portion of the $N_2$ in the plurality of adsorption beds 55 that was introduced during the pressure swing adsorption shutdown mode escapes the plurality of adsorption beds 55. Introduction of air into the plurality of adsorption beds is unavoidable when opening the adsorption system during maintenance. Maintenance may include replacing adsorbent material, replacing valves, replacing sensors, etc.

The process may comprise a catalytic steam-hydrocarbon reformer maintenance state. During the catalytic steam-hydrocarbon reformer maintenance state air is introduced into the plurality of catalyst-containing reformer tubes and at least a portion of the $N_2$ in the plurality of catalyst-containing reformer tubes that was introduced during the catalytic steam-hydrocarbon reformer shutdown mode escapes the plurality of catalyst-containing reformer tubes. Introduction of air into the plurality of catalyst-containing reformer tubes is unavoidable when opening the system during maintenance. Maintenance may include replacing one or more of the plurality of catalyst-containing tubes, replacing reforming catalyst, replacing sensors, etc.

The process comprises a pressure swing adsorption unit startup mode subsequent to the pressure swing adsorption unit maintenance state. The pressure swing adsorption unit startup mode comprises purging the plurality of adsorption beds 55 with $N_2$ 95 to decrease the concentration of $O_2$ in each of the plurality of adsorption beds 55 to less than 1.3 volume % $O_2$, or less than 0.5 volume % $O_2$. Purging with $N_2$ may be by sweep purging or pressurized purging. The pressure of the $N_2$ during sweep purging may range from greater than atmospheric pressure to 377 kPa (40 psig) or may range from 170 kPa (10 psig) to 273 kPa (25 psig).

Oxygen is removed to avoid the formation of an explosive mixture in the subsequent step of purging the plurality of adsorption beds with $H_2$.

The pressure swing adsorption unit startup mode comprises purging the plurality of adsorption beds with $H_2$ 85 to provide a $H_2$ concentration in each of the plurality of adsorption beds 55 greater than 85 volume % $H_2$ or greater than 95 volume $H_2$ or greater than 99 volume % $H_2$. The $H_2$ may be from pipeline $H_2$ 80. Purging with $H_2$ may be by sweep purging or pressurized purging. In sweep purging, $H_2$ is introduced into the adsorption vessels while an effluent gas containing $N_2$ is simultaneously removed. The pressure of the $H_2$ during sweep purging may range from greater than atmospheric pressure to 377 kPa (40 psig) or may range from 170 kPa (10 psig) to 273 kPa (25 psig). In pressurized purging, $H_2$ is introduced to increase the pressure in the adsorption vessels to any suitable pressure and an effluent gas is subsequently withdrawn from the adsorption vessels thereby removing unwanted $N_2$ from the adsorption beds and decreasing the pressure in the adsorption vessels. For pressurized purging, the adsorption vessels may be pressurized/depressurized 3 or more times until a desired concentration of $H_2$ in the adsorption beds is obtained.

The pressure swing adsorption unit startup mode comprises adjusting a pressure of the $H_2$ inside each of the plurality of adsorption beds 55 to within a respective defined target pressure range for each of the plurality of adsorption beds 55. The respective defined target pressure range is defined by the step each adsorption bed will undergo upon restarting the repetitive cycle of steps. Each of the plurality of adsorption beds will restart the repetitive cycle of steps at a particular and defined step of the repetitive cycle upon commencing restart. Each of the defined steps has a defined target pressure range for the start of the respective step. For example, the production step may have a target pressure range from 1 MPa to 4 MPa or from 2.7 MPa to 3.3 MPa, the depressurizing equalization step may have a target pressure range from 1 MPa to 4 MPa or from 2.7 to 3.3 MPa at the beginning of the depressurizing equalization step, the blowdown step may have a target pressure range from 0.2 MPa to 1 MPa or from 0.4 MPa to 0.7 MPa at the beginning of the blowdown step, the pressurizing equalization step may have a target pressure range from 0.12 MPa to 1.5 MPa or from 0.135 MPa to 0.148 MPa at the beginning of the pressurizing equalization step, and the pressurization step may have a target pressure range from 1 MPa to 3.5 MPa or from 2.1 MPa to 2.4 MPa at the beginning of the pressurization step.

The plurality of adsorption beds are purged with $H_2$ 85 and/or the pressure of the $H_2$ inside each of the plurality of adsorption beds 55 is adjusted to within the respective defined target pressure range for each of the plurality of adsorption beds 55 independent of any of the plurality of adsorption beds 85 undergoing any step of the repetitive cycle of steps. The pressure of the $H_2$ inside each of the plurality of adsorption beds 55 may be adjusted without the respective one of the plurality of adsorption beds 55 undergoing the repetitive cycle of steps it undergoes during the pressure swing adsorption unit production state. The repetitive cycle of the pressure swing adsorption unit 50 may still be halted at all in the pressure swing adsorption unit startup mode.

Flow from the catalytic steam-hydrocarbon reformer 10 to the pressure swing adsorption unit 50 may be interrupted while the pressure of the $H_2$ inside each of the plurality of adsorption beds 55 is adjusted within the respective defined target temperature range for each of the plurality of adsorption beds 55.

When purging the plurality of adsorption beds 55 during the pressure swing adsorption unit startup mode, $H_2$ 85 may be introduced into one or more of the adsorption beds 55 directly from one or more sources, each external of the pressure swing adsorption unit 50, i. e. not via one of the adsorption beds 55 of the pressure swing adsorption unit 50, as external purge $H_2$ 85 for the respective one or more of the adsorption beds 55. The external purge $H_2$ 85 may be introduced into each of the one or more adsorption beds 55 directly until the $H_2$ concentration in the respective adsorption bed 55 is greater than 85 volume % $H_2$ or greater than 95 volume % $H_2$ or greater than 99 volume % $H_2$. Purging of two or more of the adsorption beds directly with the external purge $H_2$ 85 may be by sweep purging or by pressurized purging. In sweep purging $H_2$ 85 may be introduced into the respective one of the adsorption beds 55 at a pressure greater than atmospheric pressure and below the production step pressure. Two or more of the adsorption beds 55 may be purged in parallel each directly with external purge $H_2$ 85.

The pressure swing adsorption unit startup mode may comprise purging one or more pipe headers 57, 58, 59 operatively connected to the plurality of adsorption beds 55 with $N_2$ 95 to decrease the concentration of $O_2$ in the one or more pipe headers 57, 58, 59 to less than 1.3 volume % $O_2$, or less than 0.5 volume % $O_2$, subsequently purging the one or more pipe headers 57, 58, 59 with $H_2$ 85 to provide a $H_2$ concentration in each of the one or more pipe headers greater than 99 volume % $H_2$, and adjusting a pressure of the $H_2$ inside each of the one or more pipe headers to within a respective defined target pressure range for each of the one or more pipe headers 57, 58, 59. The respective defined target pressure range for each of the one or more pipe headers is defined by a desired pressure upon restarting the repetitive cycle of steps of the plurality of adsorption beds. The one or more pipe headers may include a feed header 57, product header 59, purge gas header (not shown), and an equalization gas header (not shown). Purging with $N_2$ and purging with $H_2$ can be by sweep purging or a pressurized purging. The pressure of the $N_2$ or $H_2$ during sweep purging may range from greater than atmospheric pressure to 377 kPa (40 psig) or may range from 170 kPa (10 psig) to 273 kPa (25 psig). The target pressure range for each of the headers corresponds to the target pressure range for the adsorption bed connected to the respective header upon first restarting the repetitive cycle of steps.

The benefit of purging the plurality of adsorption beds and/or pipe headers with $H_2$ to provide a $H_2$ concentration in each of the plurality of adsorption beds greater than 99 volume % $H_2$ and adjusting the pressure of the $H_2$ inside each of the plurality of adsorption beds and/or pipe headers to within respective defined target pressure ranges is that the adsorption beds will avoid upset due to any pressure imbalance and can produce suitable quality $H_2$ product immediately upon restarting the repetitive cycle of steps.

As defined herein, the pressure swing adsorption unit startup mode ends when the $H_2$ product 60 from the pressure swing adsorption unit 50 is passed to a $H_2$ pipeline 80, to a $H_2$ product line to a customer use point, or any downstream internal process units. A $H_2$ pipeline is a pipeline that is part of a hydrogen infrastructure. Typically two or more hydrogen production units provide hydrogen to the $H_2$ pipeline.

The process comprises a catalytic steam-hydrocarbon reformer startup mode. The catalytic steam-hydrocarbon reformer startup mode comprises introducing a startup-mode reformer feed gas mixture 11' into the plurality of catalyst-containing reformer tubes 15, reacting the startup-mode reformer feed gas mixture under reaction conditions effective to form a startup-quality reformate 12' comprising $H_2$, CO, $CH_4$, and $H_2O$, and withdrawing the startup-quality reformate 12' from the plurality of catalyst-containing reformer tubes 15. The catalytic steam-hydrocarbon reformer startup mode also comprises combusting a startup-mode fuel 19' with a startup-mode oxidant gas 14' in the reformer furnace 25 external to the plurality of catalyst-containing tubes 15. The oxidant/fuel ratio may vary during the startup mode and may be higher than during the production state. Suitable oxidant/fuel ratios during startup are known in the art.

The startup-mode reformer feed gas mixture 11' may have a S-to-C molar ratio ranging from 4 to 25, or ranging from 6 to 25, or ranging from 9 to 25. The S-to-C molar ratio may be greater at the beginning of the startup mode.

The startup-mode fuel 19' may be any suitable fuel. In contrast to the fuel used during the catalytic steam-hydrocarbon reformer production state which comprises by-product gas 65 from the pressure swing adsorption unit 55, the startup-mode fuel 19' may comprise no by-product gas 65 from the pressure swing adsorption unit 55.

The startup-mode oxidant gas 14' may be air, which may be preheated by indirect heat transfer with combustion product gases in the convection section of the reformer furnace 25. The startup-mode oxidant gas 14' may be oxygen-enriched air or industrial grade oxygen. The startup-mode oxidant gas 14 may comprise gas turbine exhaust.

The startup-quality reformate 12' may be "off-specification", where it is not suitable to produce the $H_2$-containing product by separation in the pressure swing adsorption unit. The startup-quality reformate 12' may be vented or flared via line 67. The startup-quality reformate 12' may be passed via line 42' and used to form a portion of the startup-mode fuel 19'. It may be desirable not to introduce any of the startup-quality reformate 12' into any of the plurality of adsorption beds 55.

The catalytic steam-hydrocarbon reformer startup mode may be after the catalytic steam-hydrocarbon reformer shutdown mode.

At least a portion of the pressure swing adsorption startup mode is concurrent with at least a portion of the catalytic steam-hydrocarbon reformer startup mode.

The pressure swing adsorption startup mode may be initiated prior to initiating the catalytic steam-hydrocarbon reformer startup mode.

The catalytic steam-hydrocarbon reformer startup mode may comprise introducing a $N_2$- and steam-containing stream 16 during heat-up of the plurality of catalyst-containing reformer tubes 15 prior to introducing the startup-mode reformer feed gas mixture 11' into the plurality of catalyst-containing reformer tubes 15. Nitrogen from nitrogen source 90 may be blended with steam 5 to form the $N_2$- and steam-containing stream 16. Nitrogen source 90 may be any suitable and known nitrogen source.

The process may comprise a second catalytic steam-hydrocarbon reformer production state subsequent to the catalytic steam-hydrocarbon reformer startup mode. During the second catalytic steam-hydrocarbon reformer production state, a second state reformer feed gas mixture 111 is introduced into the plurality of catalyst-containing reformer tubes 15, the second state reformer feed gas mixture 111 is reacted in a reforming reaction under reaction conditions effective to form a second state reformate 112 comprising $H_2$, CO, $CH_4$, and $H_2O$, and the second state reformate 112 is withdrawn from the plurality of catalyst-containing reformer tubes 15. Also during the second catalytic steam-hydrocarbon reformer production state, a second state fuel 119 is combusted with a second state oxidant gas 114 in the reformer furnace 25 external to the plurality of catalyst-containing tubes 15 to provide heat for the reforming reaction. The second state fuel 119 comprises a second state by-product gas 165 from the pressure swing adsorption unit 50 and optionally a supplemental fuel. The second state oxidant gas 114 may be air, which may be preheated by indirect heat transfer with combustion product gases in the convection section of the reformer furnace 25. The second state oxidant gas 114 may be oxygen-enriched air or industrial grade oxygen. The second state oxidant gas 114 may comprise gas turbine exhaust.

The process may comprise a second pressure swing adsorption unit production state subsequent to the pressure swing adsorption unit startup mode. During the second pressure swing adsorption unit production state, the pressure swing adsorption unit 50 separates a second state pressure swing adsorption unit feed gas 151 formed from at least a portion of the second state reformate 112 withdrawn from the plurality of catalyst-containing reformer tubes 15 of the catalytic steam-hydrocarbon reformer 10 undergoing the second catalytic steam-hydrocarbon reformer production state to produce the $H_2$-containing product 60 and the second state by-product gas 165.

Example 1

A hydrogen production facility having a design production capacity of 100 metric tons per day of $H_2$ is shutdown for routine maintenance. After maintenance the catalytic steam-hydrocarbon reformer is started up and brought up to temperature while flowing $N_2$ and steam through the plurality of catalyst-containing reformer tubes. Natural gas fuel is combusted with air in the reformer furnace external to the plurality of catalyst-containing tubes. While fuel is combusted in the reformer furnace, the flow rate of $N_2$ and steam is maintained at greater than a specified minimum flow rate. The crossover temperature and the outlet temperatures of the reformer tubes are monitored.

Upon reaching a desired temperature in the catalytic steam-hydrocarbon reformer, a mixed feed comprising natural gas and steam is introduced into the plurality of catalyst-containing reformer tubes. The rate of introduction of mixed feed is gradually increased and the furnace heat rate is adjusted accordingly via introduction of combustion fuel to maintain desired temperatures in the reformer.

Upon reaching about 50% of the design production rate of the reformer, reformate from the reformer is passed to the pressure swing adsorption unit and the pressure swing adsorption unit is started. The cycle time for the pressure swing adsorption unit is shorter than during the pressure swing adsorption unit production state. Process condensate is removed in a condensate separator upstream of the pressure swing adsorption unit. Clean process condensate is recycled to the steam producing system. Condensate with impurities is passed to a wastewater system. Tail gas from the pressure swing adsorption unit is passed to the reformer furnace and replaces some of the combustion fuel in the reformer furnace. Effluent from the product end of the pressure swing adsorption unit does not meet design specifications and is vented as it cannot be supplied to a customer or introduced into a $H_2$ pipeline system or supplied to a downstream process unit.

It typically takes about 4-24 hours after initial reformate introduction into the pressure swing adsorption unit for the pressure swing adsorption unit to meet the required hydrogen purity requirements. During this time, at 50% of the design production rate, i.e. 50 metric tons per day of $H_2$, is lost and fuel is being consumed.

Example 2

A hydrogen production facility having a design production capacity of 100 metric tons per day of $H_2$ is shutdown for routine maintenance. After maintenance the catalytic steam-hydrocarbon reformer is started up and brought up to temperature while flowing $N_2$ and steam through the plurality of catalyst-containing reformer tubes. Natural gas fuel is combusted with air in the reformer furnace external to the plurality of catalyst-containing tubes.

Concurrent with the startup of the hydrogen production unit, the pressure swing adsorption unit is purged with $N_2$ and subsequently purged with $H_2$ from a $H_2$ pipeline. The $H_2$ pressures in each of adsorption beds and headers of the pressure swing adsorption unit are adjusted to within defined target pressure ranges for each of the adsorption beds and headers. The defined target pressure ranges are defined by the desired pressures in each of the respective adsorption beds and headers upon restarting the pressure swing adsorption unit.

Upon reaching a desired temperature in the catalytic steam-hydrocarbon reformer, a mixed feed comprising natural gas and steam is introduced into the plurality of catalyst-containing reformer tubes. The rate of introduction of mixed feed is gradually increased and the furnace heat rate is adjusted accordingly to maintain desired temperatures in the reformer by adjusting the flow rate of combustion fuel and combustion air.

Upon reaching about 50% of the design production rate of the reformer, the pressure swing adsorption unit is started and reformate from the reformer is passed to the pressure swing adsorption unit. Tail gas from the pressure swing adsorption unit is passed to the reformer furnace and replaces some of the natural gas fuel in the reformer furnace. Effluent from the product end of the pressure swing adsorption unit immediately meets purity specifications and is supplied to a customer or introduced into a $H_2$ pipeline system.

The feed mixture to the reformer is increased up to the design production rate. The flow rate of reformate to the pressure swing adsorption unit is accordingly increased and an increased flow rate of tail gas is produced and supplied to the reformer furnace as combustion fuel.

Starting up the reformer and pressure swing adsorption unit as described in example 2 results in considerable time and fuel savings as compared to example 1.

We claim:

1. A process for the production of a $H_2$-containing product in a hydrogen production facility comprising a catalytic steam-hydrocarbon reformer and a pressure swing adsorption unit, the catalytic steam-hydrocarbon reformer comprising a plurality of catalyst-containing reformer tubes in a reformer furnace and the pressure swing adsorption unit comprising a plurality of adsorption beds, the process comprising:

in a catalytic steam-hydrocarbon reformer production state, introducing a reformer feed gas mixture into the plurality of catalyst-containing reformer tubes, reacting the reformer feed gas mixture in a reforming reaction under reaction conditions effective to form a reformate comprising $H_2$, CO, $CH_4$, and $H_2O$, and withdrawing the reformate from the plurality of catalyst-containing reformer tubes, and combusting a fuel with an oxidant gas in the reformer furnace external to the plurality of catalyst-containing tubes wherein the fuel comprises at least a portion of a by-product gas from the pressure swing adsorption unit;

in a pressure swing adsorption unit production state, separating a pressure swing adsorption unit feed gas formed from at least a portion of the reformate withdrawn from the plurality of catalyst-containing reformer tubes of the catalytic steam-hydrocarbon reformer undergoing the catalytic steam-hydrocarbon reformer production state in the pressure swing adsorption unit to produce the $H_2$-containing product and the by-product gas, wherein each of the plurality of adsorption beds are subjected to a repetitive cycle of steps, the repetitive cycle of steps comprising a production step, a depressurizing equalization step, a blowdown step, a pressurizing equalization step, and a pressurization step;

in a catalytic steam-hydrocarbon reformer shutdown mode, discontinuing introduction of the reformer feed gas mixture into the plurality of catalyst-containing tubes and discontinuing combustion of the fuel with the oxidant gas, wherein the catalytic steam-hydrocarbon reformer shutdown mode is subsequent to the catalytic steam-hydrocarbon reformer production state;

in a pressure swing adsorption unit shutdown mode, discontinuing introduction of the pressure swing adsorption unit feed gas into the plurality of adsorption beds due to the catalytic steam-hydrocarbon reformer entering the catalytic steam-hydrocarbon reformer shutdown mode, and subsequently purging the plurality of adsorption beds with $N_2$ to provide a $N_2$ concentration in each of the plurality of adsorption beds greater than 96 volume % $N_2$, wherein the pressure swing adsorption unit shutdown mode occurs after the pressure swing adsorption unit production state;

in a pressure swing adsorption unit maintenance state, halting the repetitive cycle of steps and introducing air into the plurality of adsorption beds wherein at least a portion of the $N_2$ in the plurality of adsorption beds that was introduced during the pressure swing adsorption shutdown mode escapes the plurality of adsorption beds;

in a pressure swing adsorption unit startup mode, purging the plurality of adsorption beds with $N_2$ to decrease the concentration of $O_2$ in each of the plurality of adsorption beds to less than 1.3 volume % $O_2$, subsequently purging the plurality of adsorption beds with $H_2$ to provide a $H_2$ concentration in each of the plurality of adsorption beds greater than 85 volume % $H_2$, and adjusting a pressure of the $H_2$ inside each of the plurality of adsorption beds to within a respective defined target pressure range for each of the plurality of adsorption beds, the respective defined target pressure range defined by the step each adsorption bed will undergo first upon restarting the repetitive cycle of steps, wherein the pressure swing adsorption unit startup mode is subsequent to the pressure swing adsorption unit maintenance state; and in a catalytic steam-hydrocarbon reformer startup mode, introducing a startup-mode reformer feed gas mixture into the plurality of catalyst-containing reformer tubes, reacting the startup-mode reformer feed gas mixture under reaction conditions effective to form a startup-quality reformate comprising $H_2$, CO, $CH_4$, and $H_2O$, and withdrawing the startup-quality reformate from the plurality of catalyst-containing reformer tubes, and combusting a startup-mode fuel with a startup-mode oxidant gas in the reformer furnace external to the plurality of catalyst-containing tubes;

wherein at least a portion of the pressure swing adsorption startup mode is concurrent with at least a portion of the catalytic steam-hydrocarbon reformer startup mode.

2. The process according to claim 1 wherein during the pressure swing adsorption unit startup mode, the plurality of adsorption beds are purged with $H_2$ independent of any of the plurality of adsorption beds undergoing any step of the repetitive cycle of steps and/or the pressure of the $H_2$ inside each of the plurality of adsorption beds is adjusted to within the respective defined target pressure range for each of the plurality of adsorption beds independent of any of the plurality of adsorption beds undergoing any step of the repetitive cycle of steps.

3. The process of claim 1 wherein during the pressure swing adsorption unit startup mode, the repetitive cycle of steps is still halted.

4. The process of claim 3, wherein during the pressure swing adsorption unit startup mode, the plurality of adsorption beds are purged with $H_2$ and/or the pressure of the $H_2$ inside each of the plurality of adsorption beds is adjusted prior to undergoing any step of the repetitive cycle of steps.

5. The process of claim 1 further comprising restarting the repetitive cycle of steps subsequent to completing the pressure swing adsorption unit startup mode.

6. The process of claim 1 wherein during the pressures swing adsorption unit startup mode, the plurality of adsorption beds are purged with $N_2$ to decrease the concentration of $O_2$ in each of the plurality of adsorption beds to less than 0.5 volume % $O_2$.

7. The process of claim 1 wherein during the pressures swing adsorption unit startup mode, the plurality of adsorption beds are purged with $H_2$ to provide the $H_2$ concentration in each of the plurality of adsorption beds where the $H_2$ concentration is greater than 99 volume % $H_2$.

8. The process according to claim 1 wherein during the pressure swing adsorption unit shutdown mode the plurality of adsorption beds are purged with $N_2$ to provide the $N_2$ concentration in each of the plurality of adsorption beds where the $N_2$ concentration is greater than 99.6 volume % $N_2$.

9. The process according to claim 1 wherein the pressure swing adsorption startup mode is initiated prior to initiating the catalytic steam-hydrocarbon reformer startup mode.

10. The process of claim 1 wherein no portion of the startup-quality reformate is introduced into any of the plurality of adsorption beds.

11. The process of claim 1 wherein the startup-mode fuel comprises no by-product gas from the pressure swing adsorption unit.

12. The process of claim 1 wherein the $H_2$ for purging the plurality of adsorption beds during the startup mode is provided from a $H_2$ pipeline.

13. The process of claim 1 wherein the startup-quality reformate is at least one of vented, flared, or used to form at least a portion of the startup-mode fuel.

14. The process of claim 1 wherein the catalytic steam-hydrocarbon reformer startup mode comprises introducing a $N_2$- and steam-containing stream during heat-up of the plurality of catalyst-containing reformer tubes prior to introducing the startup-mode reformer feed gas mixture into the plurality of catalyst-containing reformer tubes.

15. The process of claim 1 wherein after discontinuing introduction of the reformer feed gas mixture into the plurality of catalyst-containing tubes in the catalytic steam-hydrocarbon reformer shutdown mode, the catalytic steam-hydrocarbon reformer shutdown mode comprises purging the plurality of catalyst-containing reformer tubes with $N_2$ and/or steam to decrease the total concentration of combustible gases to less than 1 volume %.

16. The process of claim 1 wherein at least one of the plurality of adsorption beds commences the production step upon restarting, at least one of the plurality of adsorption beds commences the depressurizing equalization step upon restarting, at least one of the plurality of adsorption beds commences the blowdown step upon restarting, at least one of the plurality of adsorption beds commences the pressurizing equalization step upon restarting, and at least one of the plurality of adsorption beds commences the pressurization step upon restarting.

17. The process of claim 1 further comprising:
in a second catalytic steam-hydrocarbon reformer production state, introducing a second state reformer feed gas mixture into the plurality of catalyst-containing reformer tubes, reacting the second state reformer feed gas mixture under reaction conditions effective to form a second state reformate comprising $H_2$, CO, $CH_4$, and $H_2O$, and withdrawing the second state reformate from the plurality of catalyst-containing reformer tubes, and combusting a second state fuel with a second state oxidant gas in the reformer furnace external to the plurality of catalyst-containing tubes wherein the second state fuel comprises a second state by-product gas from the pressure swing adsorption unit; and
in a second pressure swing adsorption unit production state, separating a second state pressure swing adsorption unit feed gas formed from at least a portion of the second state reformate withdrawn from the plurality of catalyst-containing reformer tubes of the catalytic steam-hydrocarbon reformer undergoing the second catalytic steam-hydrocarbon reformer production state in the pressure swing adsorption unit to produce the $H_2$-containing product and the second state by-product gas.

18. The process of claim 1 wherein the pressure swing adsorption unit startup mode further comprises purging one or more pipe headers operatively connected to the plurality of adsorption beds with $N_2$ to decrease the concentration of $O_2$ in the one or more pipe headers to less than 1.3 volume % $O_2$, subsequently purging the one or more pipe headers with $H_2$ to provide a $H_2$ concentration in each of the one or more pipe headers greater than 85 volume % $H_2$, and adjusting a pressure of the $H_2$ inside each of the one or more pipe headers to within a respective defined target pressure range for each of the one or more pipe headers.

19. The process of claim 1 further comprising:
in a catalytic steam-hydrocarbon reformer maintenance state, introducing air into the plurality of catalyst-containing reformer tubes and wherein at least a portion of the $N_2$ in the plurality of catalyst-containing reformer tubes that was introduced during the catalytic steam-hydrocarbon reformer shutdown mode escapes the plurality of catalyst-containing reformer tubes.

20. The process of claim 1
wherein the $H_2$ for purging the plurality of adsorption beds during the startup mode is provided from a $H_2$ pipeline;
wherein the catalytic steam-hydrocarbon reformer startup mode comprises introducing a $N_2$- and steam-containing stream during heat-up of the plurality of catalyst-containing reformer tubes prior to introducing the startup-mode reformer feed gas mixture into the plurality of catalyst-containing reformer tubes;

wherein after discontinuing introduction of the reformer feed gas mixture into the plurality of catalyst-containing tubes in the catalytic steam-hydrocarbon reformer shutdown mode, the catalytic steam-hydrocarbon reformer shutdown mode comprises purging the plurality of catalyst-containing reformer tubes with $N_2$ and/or steam to decrease the total concentration of combustible gases to less than 1 volume %; and wherein the pressure swing adsorption unit startup mode further comprises purging one or more pipe headers operatively connected to the plurality of adsorption beds with $N_2$ to decrease the concentration of $O_2$ in the one or more pipe headers to less than 1.3 volume % $O_2$, subsequently purging the one or more pipe headers with $H_2$ to provide a $H_2$ concentration in each of the one or more pipe headers greater than 99 volume % $H_2$, and adjusting a pressure of the $H_2$ inside each of the one or more pipe headers to within a respective defined target pressure range for each of the one or more pipe headers.

\* \* \* \* \*